June 16, 1931.  E. E. HALL  1,810,422
MOTOR VEHICLE REAR CURTAIN OPERATOR
Filed July 23, 1930   2 Sheets-Sheet 1
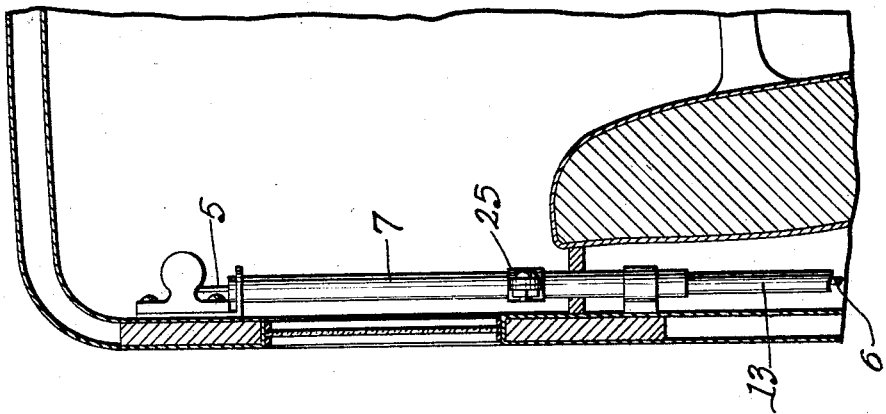
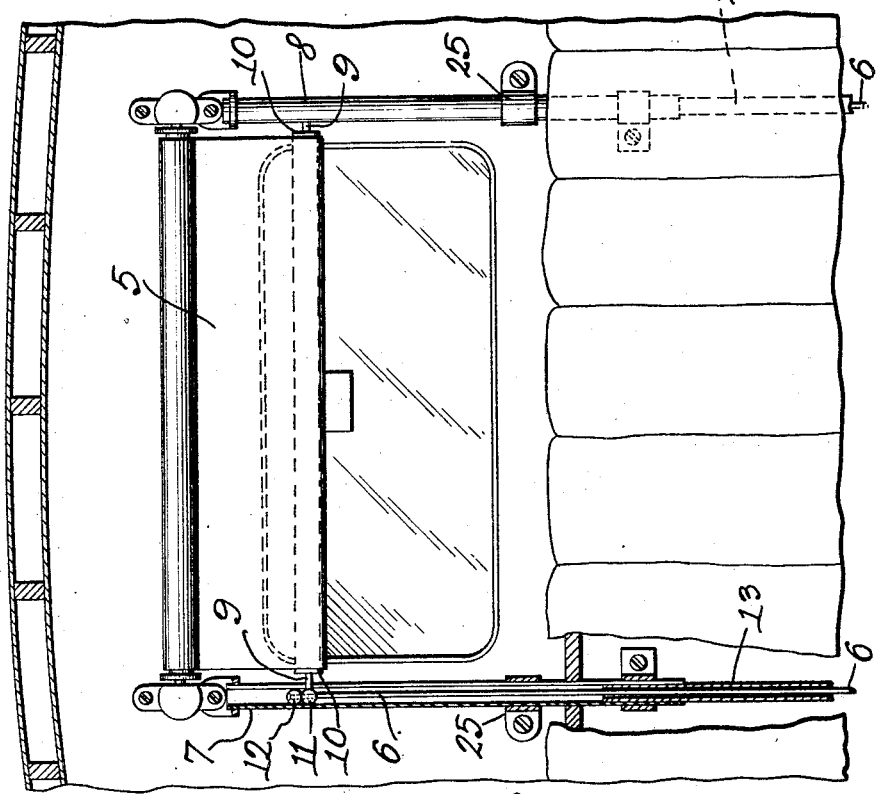
Emil E. Hall Inventor

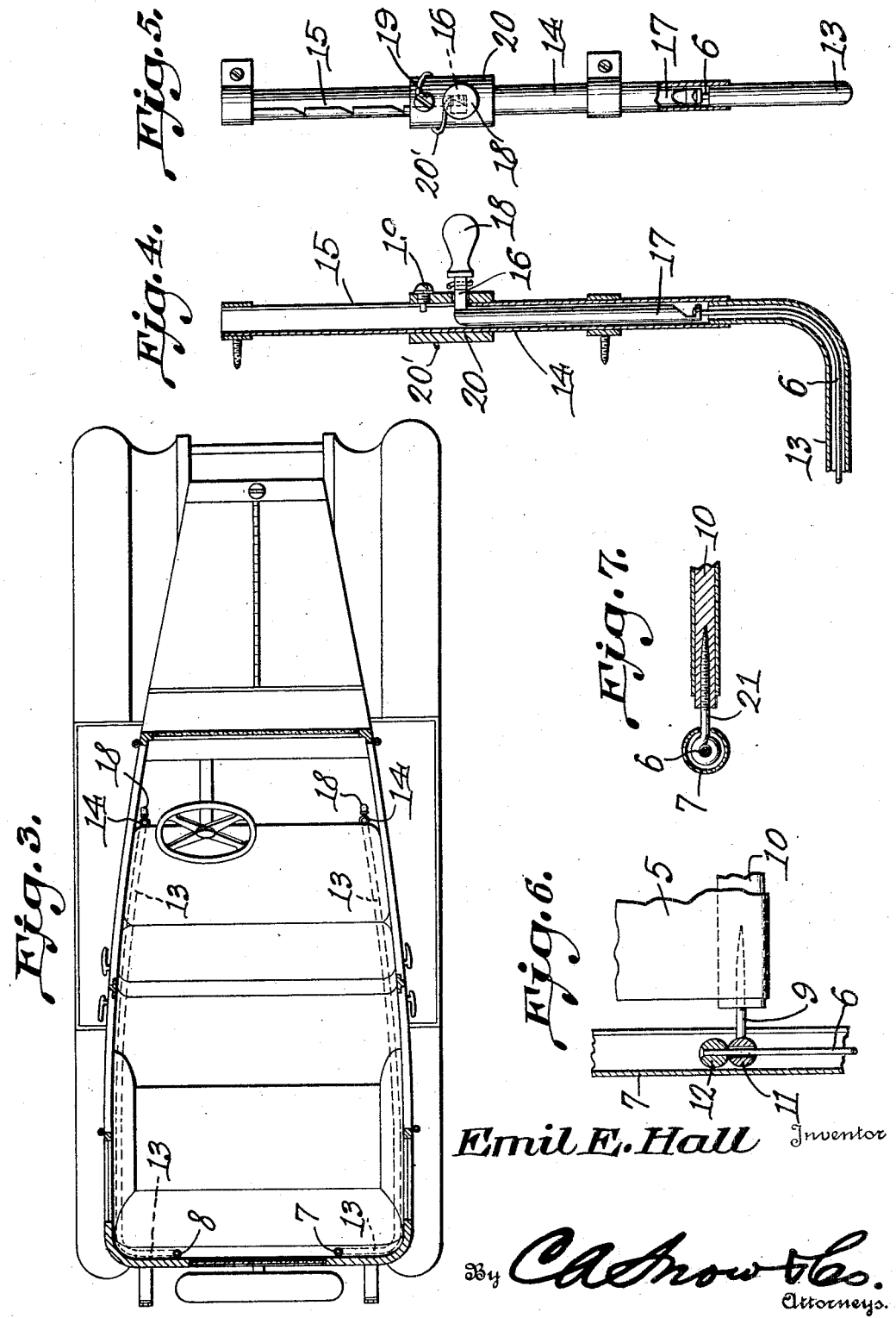
June 16, 1931. E. E. HALL 1,810,422
MOTOR VEHICLE REAR CURTAIN OPERATOR
Filed July 23, 1930 2 Sheets-Sheet 2
Emil E. Hall, Inventor Patented June 16, 1931

1,810,422

UNITED STATES PATENT OFFICE

EMIL EDWARD HALL, OF GROTON, CONNECTICUT

MOTOR VEHICLE REAR CURTAIN OPERATOR

Application filed July 23, 1930. Serial No. 470,156.

This invention relates to motor vehicles, and more particularly to the construction and operation of the rear curtain thereof, the primary object of the invention being to improve generally the construction as shown and described in my Patent Number 1,755,734.

An important object of the invention is to provide a rear curtain operating means which may be controlled by the operator seated on the operator's seat or front seat of the vehicle, so that the glare from the lamps of vehicles approaching from the rear, may be eliminated.

A still further object of the invention is to provide an operating means of this character which will permit the persons seated on the rear seat of the vehicle to operate the curtain independently of the operating means.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a motor vehicle rear curtain, showing a mechanism constructed in accordance with the invention.

Figure 2 is a vertical sectional view taken through the rear of a vehicle, illustrating the operating mechanism in elevation.

Figure 3 is a horizontal sectional view through the body of a motor vehicle, equipped with an operating mechanism constructed in accordance with the invention.

Figure 4 is a vertical sectional view through one of the tubes in which the operating members operate.

Figure 5 is a front elevational view thereof.

Figure 6 is a detail view illustrating the connection between the curtain rod and operating wire.

Figure 7 is a modified form of the invention.

Referring to the drawings in detail, a motor vehicle rear curtain is indicated by the reference character 5, the same being of the spring roller type.

The reference character 6 designates the controlling wires, that extend through the tubes 7 and 8 respectively, the tubes 7 and 8 being provided with longitudinal slots disposed on the inner sides thereof, to accommodate the shanks 9 that extend into the ends of the curtain stick 10, the shanks being provided with balls 11 that have openings extended therethrough, to receive the wires 6.

Balls 12 are secured to the inner ends of the wires 6, and engage the balls 11, when the wires 6 are pulled, to move the curtain 5 to its active or closed position. The tubes 7 and 8 are connected with tubes 13 that extend downwardly under the upholstering of the back seat of the motor vehicle, from where they extend forwardly under the floor board of the vehicle, the forward ends of the tubes 13 extending upwardly at points adjacent to the opposite sides of the front seat of the vehicle.

The forward ends of the tubes 13 extend into the lower ends of the tubes 14 that are secured adjacent to the front seat of the vehicle, the tubes 14 being provided with slots 15 to accommodate the laterally extended portions 16 of the operating rods 17, to which the forward ends of the wires 6 are connected.

Handles 18 are secured on the laterally extended portions 16 and afford means whereby a person may push or pull the rods 17, to operate the curtain.

In order that the operating rods 17 may be held in their positions of adjustment, notches are formed along one edge of each slot, for the reception of the laterally extended portion 16 of the rod 17 associated therewith. Pins 19 are carried by the sleeves 20, to which the springs 20' are secured, so that the portions 16 will be urged into engagement with the notches by the action of the springs.

Thus it will be seen that due to this construction, the operator of a vehicle, or person seated on the front seat of the vehicle, may by pulling the rods 17, cause the wires 6 to move through the tubular members, with the result that the balls 12 engage balls 11 to pull the curtain against the tension of the spring roller on which it is mounted. By releasing the operating rods 17, the spring roller will act to rewind the curtain thereon.

In the form of the invention as shown by Figure 7, screw eyes such as indicated at 21 are positioned in the ends of the curtain stick, the eye portions of the screw eyes accommodating the operating wires.

A stop 25 is mounted for adjustment on each of the tubes 7 and 8 and serves to limit downward movement of the curtain.

It will be understood that although the tubes 13 are shown and described as being under the floor boards of the vehicle they may be placed above the floor if so desired.

I claim:

An operating mechanism for the rear curtain of a motor vehicle, comprising tubes extending from the driver's seat to points at the sides of the rear curtain of the vehicle, said tubes having slots formed in the inner sides thereof, near the curtain, said curtain including a curtain stick, shanks secured to the ends of the curtain stick and extending into the slots, balls on the ends of the shanks and fitted in the tubes, said balls having openings, controlling wires extending through the tubes and openings of the balls, balls on the free ends of the controlling wires and adapted to engage the first mentioned balls to draw the curtain stick and curtain connected therewith, downwardly, and operating rods connected with the controlling wires.

In testimony that I claim the foregoing as my own, I have hereto affixed my signature.

EMIL EDWARD HALL.